United States Patent [19]

Robeson et al.

[11] Patent Number: 4,613,645

[45] Date of Patent: Sep. 23, 1986

[54] SILICON CARBIDE REINFORCEMENT OF POLY(ARYL ETHER KETONES)

[75] Inventors: Lloyd M. Robeson, Whitehouse Station; James E. Harris, Piscataway; Michael J. Michno, Jr., Bridgewater, all of N.J.

[73] Assignee: Union Carbide Corporation, Danbury, Conn.

[21] Appl. No.: 764,549

[22] Filed: Aug. 12, 1985

[51] Int. Cl.[4] ............................................. C08K 3/34
[52] U.S. Cl. .................................... 524/443; 524/599; 524/611
[58] Field of Search .................. 524/443, 611, 599

[56] References Cited

U.S. PATENT DOCUMENTS

| | | | |
|---|---|---|---|
| 3,386,840 | 6/1968 | Gruber | 524/443 |
| 3,920,605 | 11/1975 | Sato et al. | 524/443 |
| 4,111,891 | 9/1978 | Reynolds, Jr. | 106/36 |
| 4,144,207 | 3/1979 | Ohnsorg | 264/56 |
| 4,252,692 | 2/1981 | Taylor et al. | 252/504 |
| 4,463,058 | 7/1984 | Hood et al. | 75/229 |

FOREIGN PATENT DOCUMENTS 15443 1/1985 Japan.
1251641 11/1971 United Kingdom.

OTHER PUBLICATIONS

Kirk-Othmer, *Encyclopedia of Chemical Technology*, Third Edition, Wiley-Interscience, vol. 13, 968-978.
Strife et al., U. Mat. Sci., 17, 65-72, (1982).
Ishikawa et al., New Mat. & New Proc., 1, 36-42 (1981).
Teranishi et al., Ext. Abstr. Program-Bienn. Conf. 16th, 620-621 (1983).
Blumberg, J. Ind. Fab., 1, 38-52 (1982).
Negishi et al., Rev. Elec. Comm. Lab., 29, No. 1-2, Jan.-Feb. (1981).
Garcia, Naval Air Systems Command Report No. NADC-83058-60, Jul. (1983).

*Primary Examiner*—Lewis T. Jacobs

[57] ABSTRACT

Thermoplastic, injection moldable composites comprising at least one poly(aryl ether ketone) having silicon carbide whiskers dispersed therein exhibit excellent tensile properties coupled with high elongation relative to poly(aryl ether ketone) composites with other inorganic fibers. The composites are useful for making articles such as electrical connectors.

9 Claims, No Drawings

SILICON CARBIDE REINFORCEMENT OF POLY(ARYL ETHER KETONES)

FIELD OF THE INVENTION

This invention relates to thermoformable, injection moldable engineering composites comprising at least one poly(aryl ether ketone) having silicon carbide whiskers dispersed therein.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, vol. 5, 1967, pp. 2415-2427, Johnson et al., U.S. Pat. Nos. 4,108,837 and 4,175,175. Johnson et al. show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, vol 22, August, pp. 1096-1103; Blundell et al., Polymer, 1983 vol. 24, August, pp. 953-958, Atwood et al., Polymer Preprints, 20, no. 1, April 1979, pp. 191-194; and Rueda et al., Polymer Communications, 1983, vol. 24, September, pp. 258-260. In early to mid-1970, Raychem Corp. commercially introduced a PAEK called STILAN TM, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values (>50 ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers and thus would be classed as expensive polymers.

European Patent Application No. 125,816, filed Apr. 19, 1984, based for priority upon British Patent Application No. 8,313,110, filed May 12, 1983, is directed to a method for increasing the molecular weight by melt polymerization of a poly(aryl ether) such as PEEK.

The process of European Patent Application No. 125,816, provides a basis by melt polymerization above the crystalline melting point of the poly(aryl ether) to increase the molecular weight by chain extension of polymer blocks. The application theorizes that the procedure can be used for making the block copolymers described in U.S. Pat. Nos. 4,052,365 and 4,268,635. Implicit problems associated in the process of this application are the difficulty in controlling molecular weight of the resulting polymer and/or limiting isomerization and the problems associated with branching. The process of this European application would appear to be advantageous in making composites where the linearity and solution properties of the resulting polymer are not so critical.

PAEK block copolymers have been described in U.S. Pat. Nos. 4,052,365 and 4,268,635. U.S. Pat. No. 4,052,365 describes random or block copolymers having repeating units of the structure —Ar—O—Ar—CO— and —Ar—O—Ar—SO$_2$—. The patent states that these block copolymers are crystalline. U.S. Pat. No. 4,268,635 describes a process for preparing polymers containing —Ar—O—Ar—SO$_2$— and —Ar—O—Ar—CO— units which the patentee believes to contain block structures. The patent states that the polymers are crystalline and exhibit improved high temperature properties compared with totally random copolymers of similar composition. However, the block copolymers in said patents require units with —SO$_2$— linkages. The —SO$_2$— linkage tends to break up the crystallinity of the polymer which results in inferior properties as compared to polymers which do not contain the —SO$_2$— linkage but have ether and/or keto groups instead. Due to the amorphous nature of the sulfonyl containing component used in making these prior art block copolymers, lower rates of crystallization are induced and hence, their commercial utility is less than desirable. The —SO$_2$— component so adversely affects the crystallinity properties that there is a maximum limit in the T$_m$, far below that for the block polymers suitable for use in this invention. A further deficiency of these prior art block copolymers is that they cannot be used to form compatible blends with other PAEKs.

The use of reinforcing fibers and whiskers as reinforcements in plastics is also well known. See generally Kirk-Othmer, *Encyclopedia of Chemical Technology*, Third Edition, Wiley-Interscience, Volume 13, pages 968-978, which notes that glass fibers are the usual reinforcement in thermoplastics, although the use of graphite fibers is growing.

The use of silicon carbide whiskers in various matrix materials ranging from glass to metals is known as disclosed in U.S. Pat. No. 4,463,058 to Hood et al. The use of silicon carbide in a variety of plastics has also been documented widely in the patent literature. Thus U.S.

Pat. No. 4,252,692 to Taylor et al. discloses polymer compositions containing silicon carbide which exhibit non-linear electrical resistance characteristics and which are useful as heat-shrinkable materials; U.S. Pat. No. 4,144,207 to Ohnsorg discloses injection moldable and sinterable ceramic materials made by coating a ceramic material such as silicon carbide with a mixture of thermoplastic resin and oils or waxes; U.S. Pat. No. 3,920,605 to Sato et al. discloses filler reinforced coordination bonded metal compounds containing acrylonitrile and/or methacrylonitrile copolymers, wherein silicon carbide whiskers represent one among many inorganic fillers which may be used; U.S. Pat. No. 3,386,840 to Gruber discloses fibrous beta crystalline silicon carbide and reinforced shaped objects made from silicon carbide fibers and a continuous medium, including polymerized organic monomers; U.S. Pat. No. 4,111,891 to Reynolds, Jr. discloses a friction material useful in railroad disc brakes which contains silicon carbide as a friction material; British patent specification No. 1251641 to Hollingsworth et al. discloses reinforcing numerous thermoplastics with a variety of reinforcing fibers, including silicon carbide, the fibers having certain minimum mean values of tensile strength and Young's modulus and closely similar aspect ratios.

Several scientific journal articles have been published which review the properties of polymeric composites reinforced with silicon carbide whiskers or containing silicon carbide particles. The articles generally disclose applications of silicon carbide which call into play its good thermal and mechanical properties, although its ability to function in a composite as an electric insulator is also noted. Many articles cite epoxy based resin systems as a prototype, see for example Strife et al, J. Mat. Sci., 17, 65–72 (1982); Ishikawa et al, New Mat. & New Proc., 1, 36–42 (1981); Teranishi et al., Ext. Abstr. Program—Bienn. Conf. 16th, 620–621, (1983); and Garcia, Methods of Improving The Matrix Dominated Performance of Composite, Structures: A Technical Review, Naval Air Systems Command Report No. NADC-83058-60, July, (1983).

Blumberg in J. Ind. Fab., 1, 38–52 (1982) reviewed the properties and potential applications of high-modulus fibers including aramid fibers, carbon fibers, and silicon carbide fibers. The high thermal stability of silicon carbide beyond that required for even the most heat-resistant resin systems (e.g. polyimides) is noted. Blumberg concludes that a natural consequence of such high thermal stability would be to use silicon carbide in high temperature matrixes such as metals and ceramics.

Negishi et al., Rev. Elec. Comm. Lab., 29, 58–65 (January–February 1981) disclose the use of silicon carbide particles to increase the abrasion resistance of PVC submarine cable coverings.

THE INVENTION

The present invention provides tough, injection moldable thermoplastic composites, comprising at least one PAEK having silicon carbide whiskers dispersed therein. The composites exhibit unexpectedly high elongation at break relative to PAEK composites containing other inorganic fibers or whiskers, but without substantial sacrifice of other desirable properties. Good elongation is an important consideration when fabricating articles such as electrical connectors having (e.g., snap lock) areas requiring high tensile modulus and strength to withstand heavy tensile loading while at the same time exhibiting as little brittleness as possible.

The invention is surprising since high modulus using fibrous reinforcers is, at least partially, generally achieved at the expense of elongation, and vice-versa. It was therefore unexpected that the elongation of PAEK composites with silicon carbide could be improved, relative to PAEK composites with other inorganic fibers, without at the same time sacrificing tensile modulus and strength. Practically, the improved elongation without sacrifice of tensile properties translates into excellent mechanical toughness.

While not wishing to be bound by theory, it is believed that the improvement in PAEK/SiC elongation over other PAEK composites is a result of a significant specific physical interaction between PAEK and SiC. Such specific interaction is manifested by the fact that SiC whiskers lower the crystallization rate of PAEK and also depress the ultimate crystallization temperature, as hereinafter demonstrated in the examples. This is again very surprising since inorganic fillers and reinforcers generally, with respect to crystallization kinetics, are at best inert (i.e. they exert no influence at all) or act as nucleation aids thereby increasing crystallization rates and temperatures. It is further believed that the PAEK-SiC interaction is responsible for the exceptional translation of the properties of SiC whiskers to the bulk properties of PAEK/SiC composites. While it is generally not desired to lower the crytallization rate of poly(aryl ether ketones), this behavior is unexpected and manifests itself in the excellent mechanical properties and unexpectedly high elongation.

The composites of this invention are also electrically insulating, again an important consideration in making electrical components.

The silicon carbide whiskers useful in making the composites of this invention, once compounded, have a maximum average length-to-diameter (L/D) ratio between about 3 and about 200. Due to breakage and shearing during processing whiskers having an L/D ratio somewhat greater than 200 can be effectively employed to obtain an L/D ratio in the processed composite of about 200. L/D ratios much above 200 should not generally be employed since above an L/D of 200 processing in conventional injection molding and extruding equipment becomes difficult.

An amount of silicon carbide whiskers between about 2 and about 50 wt.% based on the weight of the composite may be employed. An amount of silicon carbide between about 5 and about 35 wt.% is preferred. An amount of silicon carbide of about 20 wt.% is most preferred.

Silicon carbide whiskers useful in the invention are readily commercially available, for example from Atlantic Richfield Co. under the trademark SILAR TM.

As silicon carbide whiskers yielded excellent properties when combined with poly(aryl ether ketone), silicon oxide ceramic reinforcing whiskers were investigated. These whisker like ceramic fibers are a recent commercial product and have been described in detail in a presentation by J. V. Milewski et al. presented at the 40th Annual Conference of Reinforced Plastics/Composites Institute, the SPI, Inc., Jan. 28–Feb. 1, 1985 (Session 21-E). In fact, it was reported that these whiskers gave equivalent performance to the Silar silicon carbide whiskers in epoxy. The results given herein however demonstrate that silicon carbide whiskers are vastly superior to the silicon oxide whiskers in poly(aryl ether ketones). Based on the above presentation, this was unexpected and further substantiates the high level of physical interaction between silicon carbide whiskers and poly(aryl ether ketones).

Poly(aryl ether Ketone)

The crystalline poly(aryl ether ketones) which are suitable for use herein are thermoplastic materials and can be generically characterized as containing repeating units of one or more of the following formulae:

or a direct bond and n is an integer of from 0 to 3, b, c, d and e are 0 to 1 and a is an integer of 1 to 4 and preferably d is 0 when b is 1.

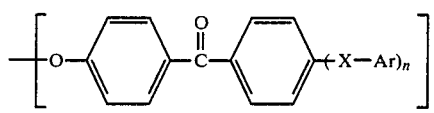

(I)

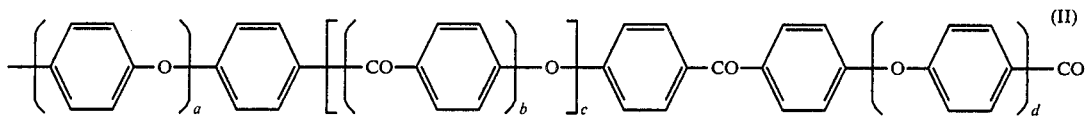

(II)

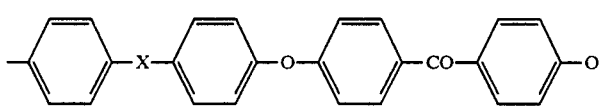

(III)

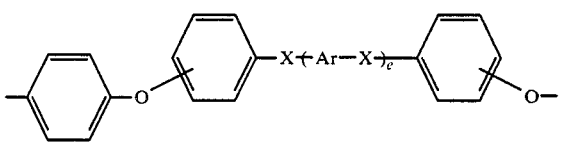

(IV)

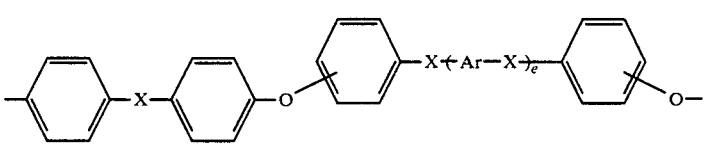

(V)

wherein Ar is independently a divalent aromatic radical selected from phenylene, biphenylene or naphthylene, X is independently —O—, Preferred poly(aryl ether ketones) include those having repeating units of the formula:

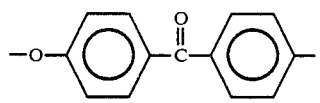
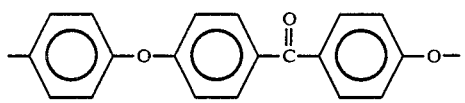
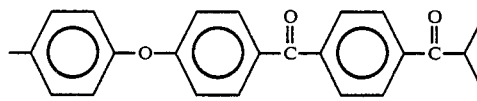
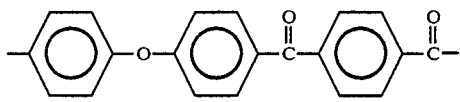
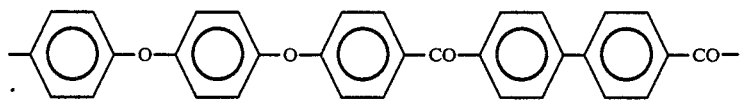
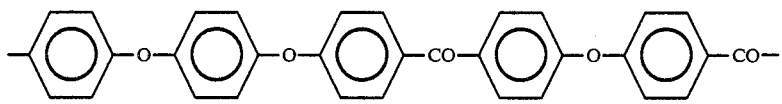

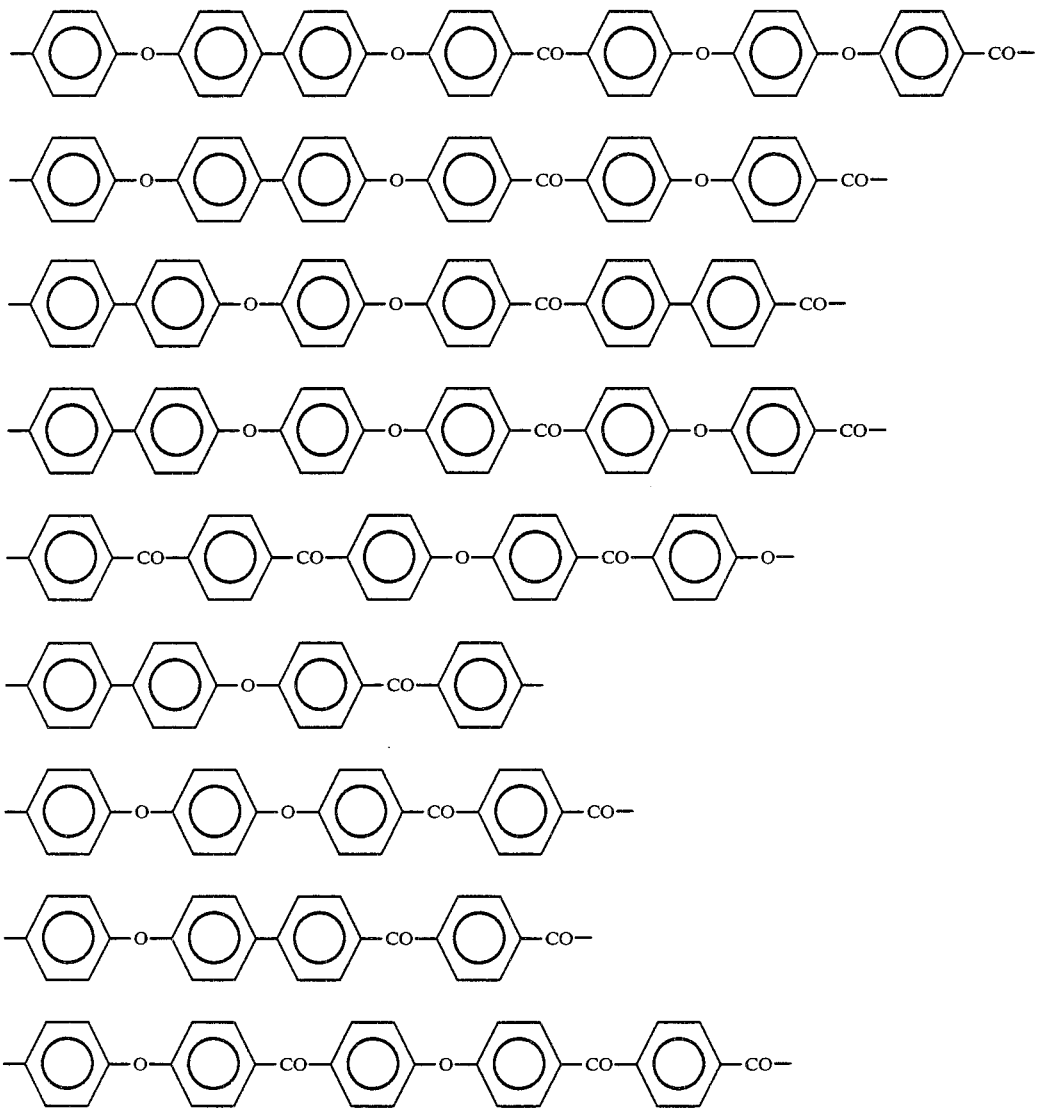

These poly(aryl ether ketones) are prepared by methods well known in the art. One such method comprises heating a substantially equimolar mixture of at least one bisphenol and at least one dihalobenzoid compound or at least one halophenol compound. Preferred bisphenols in such a process include:
hydroquinone,
4,4'-dihydroxybenzophenone,
4,4'-dihydroxybiphenyl, and
4,4'-dihydroxydiphenyl ether.

Preferred dihalo and dihalobenzoid compounds include:
4-(4-chlorobenzoyl)phenol,
4,4'-difluorobenzophenone,
4,4'-dichlorobenzophenone,
4-chloro-4'-fluorobenzophenone,

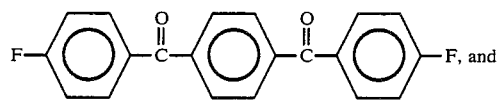
F, and

-continued

F—⟨O⟩—C(=O)—⟨O⟩—C(=O)—⟨O⟩—F

The poly(aryl ether ketones) may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ether ketones) such as those containing repeating units of the formula:

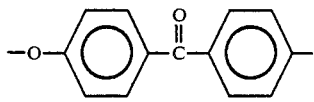

may be produced by Friedel-Craft reactions utilizing hydrogen fluoride-boron trifluoride catalysts as described, for example in U.S. Pat. No. 3,953,400.

Additionally, polyaryl ketones of the following formula:

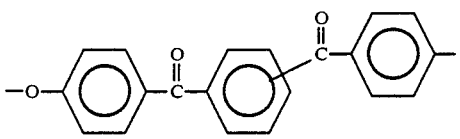

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example, U.S. Defensive Publication T 103,703 and U.S. Pat. No. 4,396,755. In such process, reactants such as (a) an aromatic monocarboxylic acid, (b) a mixture of at least one aromatic dicarboxylic acid, and (c) combinations of (a) and (b) are reacted in the presence of a fluoroalkane sulphonic acid, particularly trifluoromethane sulphonic acid.

Additionally, poly(aryl ether ketones) of the following formulas:

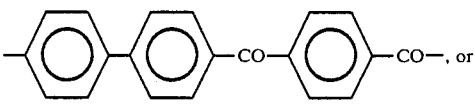

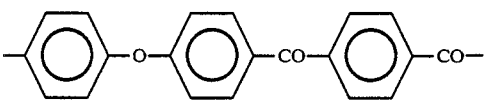

may also be prepared according to the process as described in, for example, U.S. Pat. No. 4,398,020. In such a process, (a) a mixture of substantially equimolar amounts of
(i) at least one aromatic diacyl halide of formula

where —Ar— is a divalent aromatic radical, Y is halogen and COY is an aromatically bound acyl halide group, which diacyl halide is polymerizable with at least one aromatic compound of (a)(ii), and (ii) at least one aromatic compound of the formula

wherein —Ar'— is a divalent aromatic radical and H is an aromatically bound hydrogen atom, which compound is polymerizable with at least one diacyl halide of (a)(i);

(b) at least one aromatic monoacyl halide of formula

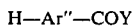

where —Ar"— is a divalent aromatic radical and H is an aromatically bound hydrogen atom, Y is halogen, and COY is an aromatically bound acyl halide group, which monoacyl halide is self-polymerizable, and (c) a combination of (a) and (b) in the presence of a fluoroalkene sulphonic acid.

The term poly(aryl ether ketone) as used herein is meant to include homopolymers, copolymers, terpolymers, graft copolymers, and the like. For example, any one or more of the units (I) to (V) may be combined to form copolymers, etc.

The poly(aryl ether ketones) have a reduced viscosity of at least about 0.4 to about 5.0 dl/g, preferably from about 0.9 to about 1.5 dl/g., as measured in concentrated sulphuric acid at 25° C. (1 gm/100 ml).

The composites of this invention may be melt processed as known in the art using conventional injection molding equipment. Composites useful for making electrical connectors via injection molding can be made by extruding a PAEK (or a combination of PAEK's if a blend is contemplated) together with SiC whiskers and injecting the extrudate, at a temperature above the melting point of the PAEK or PAEK's employed, into a mold having the desired connector shape. Advantageously, the extrudate is formed as storable pellets, but may also take other desirable forms such as powders, granules, fluffs, and so forth.

The invention is further illustrated and described by the following examples which are not, however, to be taken as limiting the scope of the invention.

EXAMPLES

Composites of poly(aryl ether ketone) and silicon carbide whiskers were prepared via extrusion in a 1" diameter 36 L/D laboratory extruder at 380°–390° C. The poly(aryl ether ketone) used was PEEK (available commercially from ICI) with a reduced viscosity of 1.2 as measured in concentrated $H_2SO_4$ (1 wt. %) at 25° C. The silicon carbide whiskers utilized were SILAR TM SC-10 obtained from Atlantic Richfield Co. The extruded composites were injection molded into test specimens for testing for tensile modulus, tensile strength, and elongation as per ASTM D-638, notched izod impact strength as per ASTM D-256, tensile impact strength as per ASTM D-1822, heat distortion temperature as per ASTM D-648, and flexural modulus and flexural strength as per ASTM D-790. The results are tabulated in Table I.

The crystallization kinetics and relevant calorimetry data were determined using a Perkin-Elmer DSC-2 differential scanning calorimeter. The samples were heated and cooled at 10° C./minute from 23° C. to 370° C. under $N_2$. After reheating to 370° C., they were cooled at about 160° C./min to the temperatures as listed to determine time for maximum cystallization rate ($t_c$). The results are listed in Table II. The lowered crystallization temperature ($T_c$) and longer times ($t_c$) to reach the maximum crystallization rate are indicative of lower crystallization rates, and indicate a specific interaction between PEEK and SiC whiskers.

TABLE I

PEEK-SILICON CARBIDE COMPOSITES[1]

|  | PEEK | 90% PEEK 10% Silar TM-SC-9 | 20% Glass Fiber filled PEEK | 80% PEEK 20% Silar TM SC-9 | 30% GLASS filled PEEK | 80% PEEK 20% Silar TM SC-10 |
|---|---|---|---|---|---|---|
| Tensile Modulus (psi) | 517,000 | 804,000 | 1,100,000 | 1,200,000 | 1,444,000 | 997,000 |
| Tensile Strength (psi) | 12,900 | 15,400 | 20,000 | 19,700 | 23,000 | 17,400 |
| % Elongation | 103 | 12.5 | 3 | 7.3 | 2.5 | 9.7 |
| Notched Izod Impact Strength ft-lbs/in of notch | 1.6 | 1.6 | 1.4 | 1.4 | — | 1.4 |
| Tensile Impact Strength ft-lbs/in$^2$ | 49 | 49 | 50 | 49 | — | 49 |
| Heat Distortion Temperature 264 psi; $\frac{1}{8}$" bar. | 143° C. | 148° C. | 215–250° C.[2] | 155° C. | <250° C. | 152° C. |
| Flexural Modulus (psi) |  | 784,000 | — | 1,210,000 |  | 1,040,000 |
| Flexural Strength (psi) |  | 25,000 | — | 31,500 |  | 28,100 |

[1]All percentages are based on total composite weight
[2]annealed

TABLE II

PEEK-SILICON CARBIDE COMPOSITES[1]

|  | PEEK | 90% PEEK 10% SC-9 Silicon-Carbide | 80% PEEK 20% SC-9 Silicon-Carbide | 80% PEEK 20% SC-10 Silicon-Carbide |
|---|---|---|---|---|
| Tm (°C.) | 337 | 336 | 336 | 336 |
| $\Delta H_f$ (cal/g) | 8.3 | 7.1 | 6.1 | 5.9 |
| Tc (°C.) | 298 | 291 | 291 | 291 |
| $\Delta H_c$ (cal/g) | 10.2 | 8.9 | 8.1 | 8.2 |
| $t_c$ at 310° C. (sec) | 212 | 432 | 470 | 455 |
| $t_c$ at 300° C. (sec) | 78 | 136 | 150 | 144 |

Tm = Crystalline melting point.
$\Delta H_f$ = Heat of fusion.
Tc = Crystallization of temperature
$\Delta H_c$ = Heat of crystallization
$t_c$ = Time to reach maximum crystallization temperature
[1]See TABLE I Like carbon fibers, silicon carbide is semi-conductive to conductive. For many applications, electrically insulating properties are desired. It was unexpected that the composites listed in Table I were non-conductive and exhibit electrical resistance values desired for insulating requirements. These values are listed below and compared with a carbon fiber reinforced PEEK:

|  | Volume Resistivity ohm-cm |
|---|---|
| 90% PEEK 10% Silar TM SC-9 | $5.3 \times 10^{16}$ |
| 80% PEEK 20% Silar TM SC-9 | $6.0 \times 10^{15}$ |
| 80% PEEK 20% Silar TM SC-10 | $5.5 \times 10^{15}$ |
| 70% PEEK 30% Carbon Fiber | 1400 |
| PEEK* | $10^{16}$ |

*Reported by E. Galli, Plastics Design Forum, p. 92, March/April 1985.

These results demonstrate a significant advantage for silicon carbide reinforcement where insulating properties are necessary or desired.

Silicon carbide whiskers utilized in this study have the physical property characteristics as listed below. The electrical resistivity is 10 ohm-cm at 75° F. (B. M. Walker in *Handbook of Fillers and Reinforcements for Plastics*, edited by H. S. Katz and J. V. Milewski, p. 172, Van Nostrand Reinhold Co., New York, 1978).

| SILAR TM SC-9 | |
|---|---|
| Physical Properties | |
| Ave. Diameter, μm | 0.6 |
| Length Range (>80 wt %), μm | 10–80 |
| Surface Area, m$^2$/g | 3.0 |
| Density, g/cm$^3$ | 3.2 |
| Bulk Density, g/cm$^3$ | ~0.2 |
| Whisker Content, % | 80–90 |
| Particle Content, % | 10–20 |
| Bulk Chemical Properties | |
| Crystal Type | Alpha |
| Free Carbon, Max Wt % | 0.10 |
| Vaporized by HF, eg. SiO$_2$, max wt % | 0.75 |
| Metals Analysis | Nominal ppm |
| Calcium | 3700 |
| Manganese | 2400 |
| Aluminum | 1300 |
| Magnesium | 800 |
| Iron | 500 |
| Chromium | <50 |
| Nickel | <50 |
| Potassium | <50 |
| Sodium | <50 |
| Copper | <25 |
| Boron | <10 |
| Lithium | <10 |
| Titanium | <10 |

| SILAR TM SC-10 | |
|---|---|
| Physical Properties | |
| Ave. Diameter, μm | 0.6 |
| Length Range (<80 wt %), μm | 10–80 |
| Surface Area, m$^2$/g | 3.0 |
| Density, g/cm$^3$ | 3.2 |
| Bulk Density, g/cm$^3$ | ~0.2 |
| Whisker Content, % | 70–80 |
| Particle Content, % | 20–30 |
| Bulk Chemical Properties | |
| Crystal Type | Alpha |
| Free Carbon, Max Wt % | 0.2 |
| Vaporized by HF, eg. SiO$_2$, max wt % | 1.5 |
| Metals Analysis | Nominal ppm |
| Calcium | 3700 |
| Manganese | 2400 |
| Aluminum | 800 |
| Iron | 500 |
| Chromium | <50 |
| Nickel | <50 |
| Potassium | <50 |
| Sodium | <50 |
| Copper | <25 |
| Boron | <10 |
| Lithium | <10 |
| Titanium | <10 |

Composites of poly(aryl ether ketone) (PEEK from ICI) with silicon oxide ceramic whiskers (XPV1 from J. M. Huber Corp.) were prepared via extrusion at 360°-390° C. followed by injection molding into test specimen at 705°-725° F. The properties of the silicon oxide ceramic whiskers are listed below:

| XPV1 Ceramic Fiber | |
|---|---|
| Composition | |
| Amorphous silicon dioxide | 75.6% |
| Crystalline elemental silicon | 20.2% |
| Carbon (free and as SiC) | 3.8% |
| Nitrogen and other trace elements | 0.4% |
| Specific gravtity | 2.25 g/cc |
| Fiber diameter | 2-20 nanometers (95%) |
| L/D | 10-20 |
| Specific Surface (BET) | 35-50 m²/g |

The properties of the XPV1/PEEK Composite are listed in Table III. The reinforcing capabilities of XPV1 are significantly poorer than silicon carbide and the ultimate elongation is lower. In view of prior results reported showing equivalence in epoxy, this result is unexpected and demonstrates the uniqueness of silicon carbide/poly(aryl ether ketone) composites.

TABLE III

| Sample Description | Tensile Modulus (psi) | Tensile Strength (psi) | % Elongation |
|---|---|---|---|
| 90% PEEK 10% XPVI | 597,000 | 12,800 | 3.8 |
| 80% PEEK 20% XPVI | 682,000 | 13,200 | 5.2 |

Other polymers offering mechanical compatibility with poly(aryl ether ketones) may be added to the PAEK-silicon carbide composites in an amount up to about 50 wt.% based on the total weight of the composite. These include poly(etherimides), polyimides, polysulfone, poly(ethersulfone), poly(aryl ether sulfone), polyarylates, and poly(phenylene sulfide). Other fibrous as well as non-fibrous fillers can be added to impart specific property combinations of interest. Polytetrafluoroethylene addition to improve wear resistance (multiple traversal) would also be of interest.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A thermoplastic, injection moldable composite comprising at least one poly(aryl ether ketone) having silicon carbide whiskers dispersed therein.

2. A composite as defined in claim 1 wherein the poly(aryl ether ketone) contains repeating units of one or more of the following formulae:

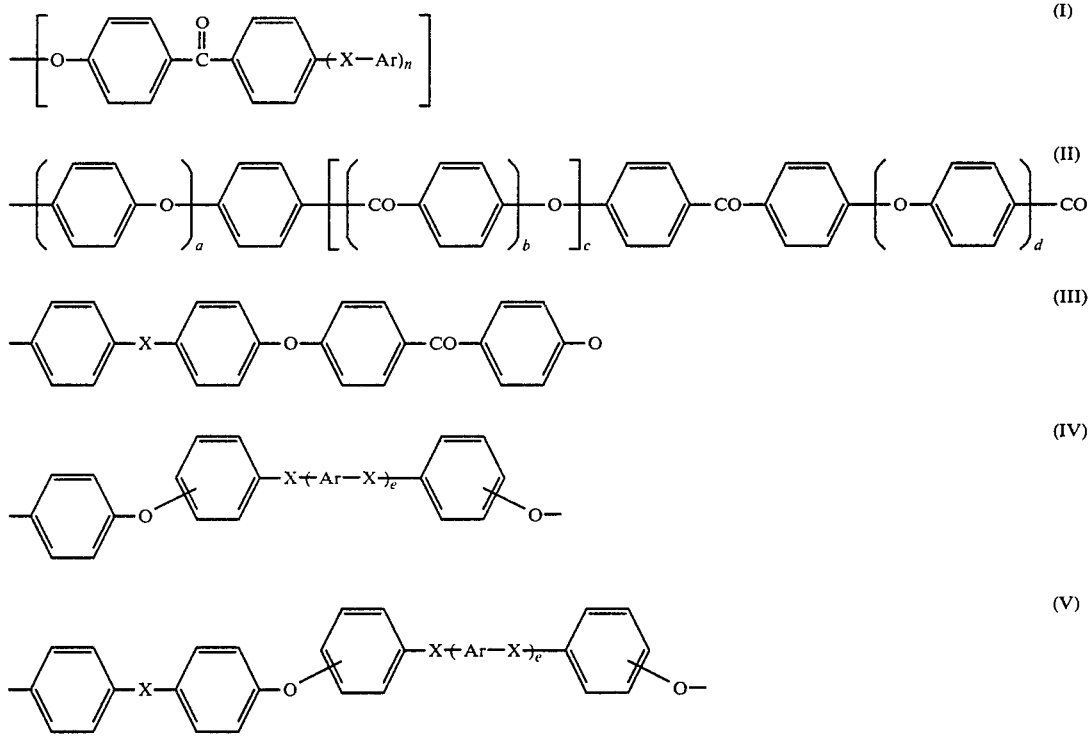

wherein Ar is independently a divalent aromatic radical selected from phenylene, biphenylene or naphthylene, X is independently —O—,

or a direct bond and n is an integer of from 0 to 3, b, c, d and e are 0 to 1 and a is an integer of 1 to 4.

3. A composite as defined in claim 1 wherein the poly(aryl ether ketones) have repeating units of one or more of the following formula:

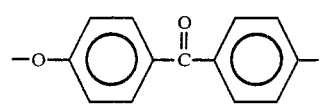 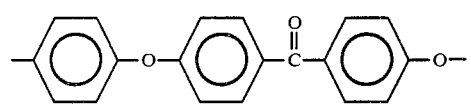
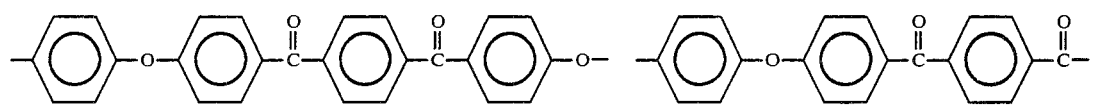 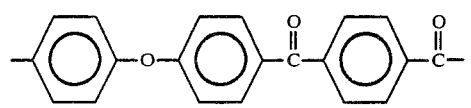
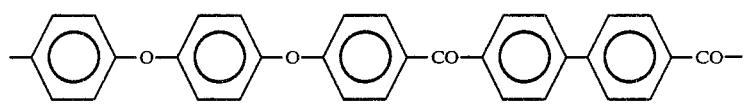
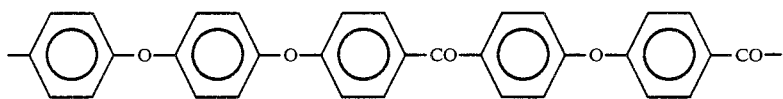
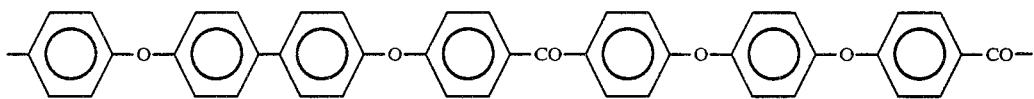
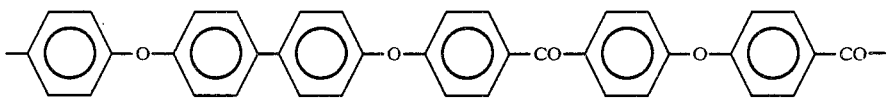
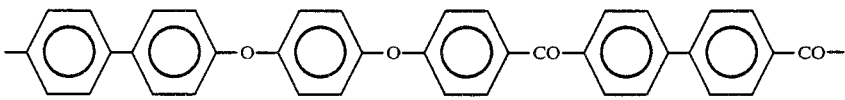
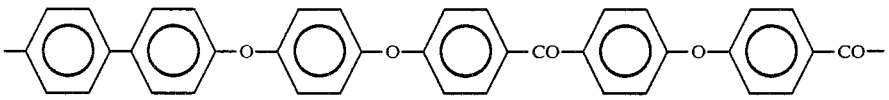
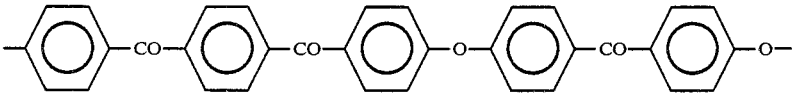
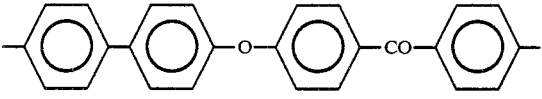
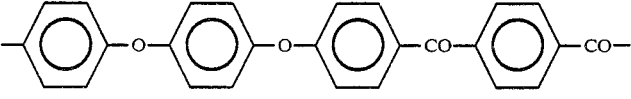
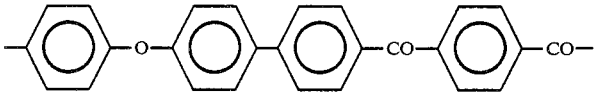

-continued

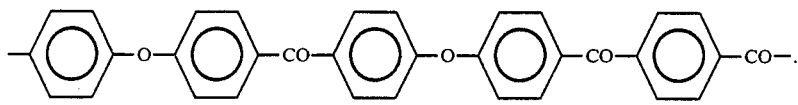

4. A composite as defined in claim 1, wherein said silicon carbide whiskers have an L/D ratio between 3 and about 200.

5. A composite as defined in claim 1, wherein said silicon carbide whiskers are present in an amount between about 2 and about 50 wt. % based on the weight of the composite.

6. A composite as defined in claim 5, wherein said whiskers are present in an amount between about 5 and about 35 wt. %.

7. A composite as defined in claim 6, wherein said whiskers are present in an amount of about 20 wt. %.

8. A composite as defined in claim 1, further comprising, in an amount up to about 50 wt.% based on the total weight of the composite, a polymer selected from the group consisting of poly(etherimides), polyimides, polysulfone, poly(ethersulfone), poly(aryl ether sulfone), polyarylates, and poly(phenylene sulfide).

9. The composite of claims 1, 2, 3, 4, 5, 6, 7 or 8, in the form of an electrical connector.

* * * * *